(12) United States Patent
Buettner et al.

(10) Patent No.: US 6,740,142 B2
(45) Date of Patent: May 25, 2004

(54) INDUSTRIAL BAG HOUSE ELEMENTS

(75) Inventors: John M. Buettner, Stillwater, MN (US); James A. Leblanc, Eden Prairie, MN (US); Mark A. Gogins, Roseville, MN (US); Thomas M. Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/871,006

(22) Filed: May 31, 2001

(65) Prior Publication Data

US 2002/0073849 A1 Jun. 20, 2002

Related U.S. Application Data

(60) Provisional application No. 60/230,138, filed on Sep. 5, 2000.

(51) Int. Cl.[7] ............................................... B01D 46/02
(52) U.S. Cl. ........................... 95/273; 95/280; 55/301; 55/341.1; 55/382; 55/487; 55/527; 55/528; 156/60; 156/204; 156/227; 156/250
(58) Field of Search .................... 55/482, 486, 487, 55/527, 528, 341.1, 382, 304, DIG. 2, 301, 302; 95/273, 278, 280, 282; 442/36; 156/60, 196, 204, 227, 250, 251

(56) References Cited

U.S. PATENT DOCUMENTS

| 567,399 A | 9/1896 | Laws |
|---|---|---|
| 2,835,341 A | 5/1958 | Parker, Jr. |
| 2,980,204 A | 4/1961 | Jordan |

(List continued on next page.)

FOREIGN PATENT DOCUMENTS

| DE | 299 07 699 U1 | 9/1999 | |
|---|---|---|---|
| EP | 0351046 A2 * | 1/1990 | ............ D01F/6/34 |
| EP | 0 489 395 A1 | 6/1992 | |
| EP | 0 811 412 A1 | 12/1997 | |
| EP | 1 048 355 A1 | 11/2000 | |
| GB | 745030 | 2/1956 | |
| GB | 969327 | 8/1960 | |
| JP | 05195322 A2 | 8/1993 | |
| JP | 05239778 A2 | 9/1993 | |
| JP | 06057530 A2 | 3/1994 | |
| JP | 06057531 A2 | 3/1994 | |
| JP | 06264301 A2 | 9/1994 | |
| WO | WO 94/18364 | 8/1994 | |
| WO | WO 99/16532 | 4/1999 | |
| WO | WO 00/01737 | 1/2000 | |

OTHER PUBLICATIONS

Adanur, S. et al., "Recovery and Reuse of Waste PVC Coated Fabrics. Part 1: Experimental Procedures and Separation of Fabric Components", *Jour. of Coated Fabrics*, vol. 28, pp. 37–55 (Jul. 1998).

Angelo, R. et al., "Preparation and Characterization of Selectively Isotopically Labeled Nylon 66 Polymers", *Macromolecules*, vol. 22, pp. 117–121 (1989).

Basutkar, P. et al., "Synthesis and Characterization of Phenylated Aromatic Poly(amide–amides)s", *Jour. of Applied Polymer Science*, vol. 68, pp. 1523–1530 (1998).

(List continued on next page.)

*Primary Examiner*—Duane Smith
*Assistant Examiner*—Jason M. Greene
(74) *Attorney, Agent, or Firm*—Merchant & Gould P.C.

(57) ABSTRACT

The filter structures commonly known as a bag house or a filter bag or an air filter with a bag construction can be made by preparing the bag assembly, either in a tubular or a bi-fold construction by placing a layer of fine fiber on the upstream surface of the filter media structure. The filter assembly includes a filter cabinet with an interior component. The filter component is suspended within the filter cabinet interior. The filter component includes a frame or support for the filter media. The frame or support holds the filter bags such that the filter bags are suspended from the frame in the cabinet interior. The intake air enters the cabinet, passes through the filter assembly and exits the cabinet. The air must pass first into the fine fiber layer, the filter media and then the exterior of the cabinet.

84 Claims, 6 Drawing Sheets

U.S. PATENT DOCUMENTS

| | | | | |
|---|---|---|---|---|
| 3,102,793 A | | 9/1963 | Alban | |
| 3,207,620 A | * | 9/1965 | Roth | 524/343 |
| 3,236,679 A | | 2/1966 | Spiller et al. | |
| 3,251,475 A | | 5/1966 | Till et al. | |
| 3,258,900 A | | 7/1966 | Harms | |
| 3,295,298 A | | 1/1967 | Mackey | |
| 3,360,598 A | | 12/1967 | Earnhart | |
| 3,387,433 A | | 6/1968 | Mackey | |
| 3,475,884 A | | 11/1969 | Kulzer | |
| 3,565,979 A | | 2/1971 | Palmer | |
| 3,570,675 A | | 3/1971 | Pall et al. | |
| 3,596,441 A | * | 8/1971 | Lundahl | 55/382 |
| 3,689,608 A | | 9/1972 | Hollberg et al. | |
| 3,731,352 A | * | 5/1973 | Okamoto et al. | 19/0.6 |
| 3,733,790 A | | 5/1973 | Pierce | |
| 3,739,055 A | * | 6/1973 | Ueda et al. | 264/235 |
| 3,745,748 A | | 7/1973 | Goldfield et al. | |
| 3,755,527 A | | 8/1973 | Keller et al. | |
| 3,772,136 A | | 11/1973 | Workman | |
| 3,825,380 A | | 7/1974 | Harding et al. | |
| 3,839,529 A | | 10/1974 | Serres et al. | |
| 3,851,023 A | | 11/1974 | Brethauer et al. | |
| 3,888,610 A | | 6/1975 | Brackmann et al. | |
| 3,994,258 A | | 11/1976 | Simm | |
| 4,011,067 A | | 3/1977 | Carey, Jr. | |
| 4,020,230 A | | 4/1977 | Mahoney et al. | |
| 4,143,196 A | | 3/1979 | Simm et al. | |
| 4,148,595 A | | 4/1979 | Bednarz | |
| 4,210,615 A | | 7/1980 | Engler et al. | |
| 4,215,682 A | | 8/1980 | Kubik et al. | |
| 4,223,101 A | | 9/1980 | Fine et al. | |
| 4,230,650 A | | 10/1980 | Guignard | |
| 4,278,623 A | | 7/1981 | Niegisch | |
| 4,290,987 A | | 9/1981 | Soehngen et al. | |
| 4,323,525 A | | 4/1982 | Bornat | |
| 4,340,479 A | | 7/1982 | Pall | |
| 4,370,290 A | | 1/1983 | Makino et al. | |
| 4,468,428 A | | 8/1984 | Early et al. | |
| 4,469,606 A | | 9/1984 | Reid et al. | |
| 4,650,506 A | * | 3/1987 | Barris et al. | 55/487 |
| 4,689,186 A | | 8/1987 | Bornat | |
| 4,804,707 A | * | 2/1989 | Okamoto et al. | 525/132 |
| 4,824,451 A | | 4/1989 | Vogt et al. | |
| 4,826,519 A | | 5/1989 | Miyagi et al. | |
| 4,842,505 A | | 6/1989 | Annis et al. | |
| 4,842,924 A | | 6/1989 | Farris et al. | |
| 4,849,474 A | * | 7/1989 | Gallucci | 524/343 |
| 4,874,399 A | | 10/1989 | Reed et al. | |
| 4,900,671 A | | 2/1990 | Pokora et al. | |
| 4,915,886 A | | 4/1990 | Repetti et al. | |
| 4,929,502 A | | 5/1990 | Giglia | |
| 4,992,515 A | | 2/1991 | Ballard | |
| 5,082,476 A | | 1/1992 | Kahlbaugh et al. | |
| 5,104,537 A | | 4/1992 | Stifelman et al. | |
| 5,166,246 A | | 11/1992 | Gallucci et al. | |
| 5,188,376 A | * | 2/1993 | Ueda et al. | 277/536 |
| 5,203,201 A | | 4/1993 | Gogins | |
| 5,238,735 A | | 8/1993 | Nagou et al. | |
| 5,273,565 A | | 12/1993 | Milligan et al. | |
| 5,324,558 A | * | 6/1994 | Muto et al. | 138/129 |
| 5,342,433 A | * | 8/1994 | Avondoglio | 55/304 |
| 5,364,456 A | | 11/1994 | Kahlbaugh et al. | |
| 5,411,576 A | | 5/1995 | Jones et al. | |
| 5,429,864 A | * | 7/1995 | Samuels | 156/148 |
| 5,472,481 A | | 12/1995 | Jones et al. | |
| 5,496,507 A | | 3/1996 | Angadjivand et al. | |
| 5,672,399 A | * | 9/1997 | Kahlbaugh et al. | 55/527 |
| 5,820,646 A | | 10/1998 | Gillingham et al. | |
| 5,843,442 A | | 12/1998 | Soule et al. | |
| 5,853,442 A | * | 12/1998 | Glen et al. | 55/378 |
| 5,863,701 A | | 1/1999 | Mertesdorf | |
| 5,895,510 A | | 4/1999 | Butler et al. | |
| 5,908,598 A | | 6/1999 | Rousseau et al. | |
| 5,919,847 A | | 7/1999 | Rousseau et al. | |
| 5,931,988 A | * | 8/1999 | LeBlanc et al. | 55/378 |
| 5,954,849 A | | 9/1999 | Berkhoel et al. | |
| 5,968,635 A | | 10/1999 | Rousseau et al. | |
| 5,976,208 A | | 11/1999 | Rousseau et al. | |
| 5,993,580 A | | 11/1999 | Nakayama et al. | |
| 6,002,017 A | | 12/1999 | Rousseau et al. | |
| 6,048,661 A | | 4/2000 | Nishi et al. | |
| D425,189 S | | 5/2000 | Gillingham et al. | |
| 6,063,862 A | * | 5/2000 | Idemura et al. | 162/157.3 |
| 6,068,799 A | * | 5/2000 | Rousseau et al. | 264/115 |
| 6,090,173 A | | 7/2000 | Johnson et al. | |
| 6,110,249 A | | 8/2000 | Medcalf et al. | |
| 6,123,751 A | | 9/2000 | Nelson et al. | |
| 6,156,086 A | * | 12/2000 | Zhang | 55/382 |
| 6,177,192 B1 | * | 1/2001 | Asano et al. | 428/364 |
| 6,265,333 B1 | * | 7/2001 | Dzenis et al. | 156/276 |
| 6,348,432 B1 | * | 2/2002 | Elmasry | 503/201 |
| 6,354,296 B1 | * | 3/2002 | Baumann et al. | 128/206.14 |
| 6,391,807 B1 | * | 5/2002 | Jariwala et al. | 123/142.5 R |
| 6,395,046 B1 | * | 5/2002 | Emig et al. | 55/382 |

OTHER PUBLICATIONS

Baumgarten, P., "Electrostatic Spinning of Acrylic Microfibers", *Jour. of Colloid and Interface Science* vol. 36, No. 1, 9 pages (May 1971).

Benavente, J. et al., "Electrical Properties of Modified Aromatic Polyamide Membranes", *Separation Science and Technology*, vol. 32, No. 13, pp. 2189–2199 (1997).

Bognitzki, M. et al., "Polymer, Metal and Hybrid Nano–and Mesotubes by Coating of Degradable Polymer Template Fibers (Turf–process)", Philipps–University Marburg, Department of Chemistry, Mainz, Germany, pp. 45 and 46 (Date Unknown).

Bognitzki, M. et al., "Submicrometer Shaped Polylactide Fibers by Electrospinning", Phillips–University Marburg, Department of Chemistry, Mainz, Germany, pp. 115 and 116 (Date Unknown).

Chun, I. et al., "Carbon Nanofibers from Polyacrylonitrile and Mesophase Pitch" *Jour. of Advanced Materials*, vol. 31, No. 1, pp. 36–41 (Jan. 1999).

DCE Filters Brochure "Dalamatic Filter Bags—1.5m$^2$", 1 page (Before Sep. 5, 2000).

DCE Filters Brochure "Unimaster Filters", 1 page (Before Sep. 5, 2000).

Deitzel, J. et al., "Generation of Polymer Nanofibers Through Electrospinning", *Army Research Labm Aberdeen Proving Ground, MD 21005–5066*, ARL–TR1898, pp. 1–36 (Jun. 1999).

Dhawan, S. et al., Conducting Fabrics as a Shield Against Electromagnetic Interference (EMI), *Jour. of Coated Fabrics*, vol. 28, pp. 29–36 (Jul. 1998).

Donaldson® Brochure, Ultra–Web® "Premium Quality–High Efficiency Filters", 4 pages (1994).

Donaldson Brochure, DOnaldson® Gas Turbine Systems, DZ2000™ Panel Filters with Spider–Web® Filter Media, 4 pages (1997).

Donaldson Brochure, Eon™ Fine Fiber Technology by Donaldson, 6 pages (1999).

Donaldson® Brochure, Tech Topics, "Do Spider–Web Replacement Filters Really 'Cost' Extra? Analysis Shows How Savings from High Performance Far Outweigh a Premium Price", 2 pages (Jul. 1999).

Donaldson® Brochure, Filtration Solutions for Gas Turbines, Generators, and Compressors, "DZ2000 Air Filter Media, The Longer Life, Higher Value Filter Media for Gas Turbine Inlet Air Filter Systems", 4 pages (Dec. 2000).

Doshi, J., "The Electrospinning Process and Applications of Electrospun Fibers", *UMI Dissertation Services*University of Akron, pp. 1–170, including sections (Aug. 1994).

Fang, X., "Application of Electrospinning for Polymers", *UMI Dissertation Services*, University of Akron, pp. 1168, including sections (Aug. 1997).

Gibson, P. et al., "Electrospinning Technology: Direct Application of Tailorable Ultrathin Membranes", Jour. of Coated Fabrics, vol. 28, pp. 63–72 (Jul. 1998).

Giessmann, A. et al., "Multipurpose Production Line for the Coated Textile Industry", *Jour. of Coated Fabrics*, vol. 28, pp. 56–62 (Jul. 1998).

Huang, M. et al., "The Modification of Nylon 6 by a Phenol–Formaldehyde Resin", *Jour. of Applied Polymer Science*, vol. 48, pp. 563–572 (1993).

Huang, P. "Modification of Nylon 6 by Phenol–Containing Polymers" *Jour. of Applied Polymer Science*, vol. 73, pp. 295–300 (1999).

Huang, R. et al., "Crosslinked Blended Poly(vinyl alcohol)/N–Methylol Nylon–6 Membranes for the Pervaporation Separation of Ethanol–Water Mixtures", *Jour. of Applied Polymer Science*, vol. 70, pp. 317–327 (1998).

Kim, J. et al., "Polybenzimidazole Nanofiber Produced by Electrospinning", *Polymer Engineering and Science* vol. 39, No. 5, pp. 849–854 (May 1999).

Kirichenko, V. et al., "Acceleration of a Free Jet of Low-conducting Liquid in an Electric Field", *Sov. Phys. Dokl*, vol. 35, No. 12, pp. 1018–1020 (Dec. 1990).

Kirichenko, V. et al., "Charge Transfer due to the Electrohydrodynamic Atomization of a Liquid", *Sov. Phys. Dokl.*, vol. 33, No. 8, pp. 564–566 (Aug. 1988).

Kirichenko, V. et al., "Domains of Existence of Free, Stationary Liquid Jets in a Strong External Electric Field", *Sov. Phys. Dokl.*, vol. 32, No. 7, pp. 544–547 (Jul. 1987).

Kirichenko, V. et al., "Gas Flow and Filtration Through Permeable Channel Walls", *Phys. Dokl.*, vol. 38, No. 4, pp. 139–141 (Apr. 1993).

Kirichenko, V. et al., "Shape of a Free, Stationary Liquid Jet in a Strong Uniform Electric Field", *Sov. Phys. Dokl*, vol. 32, No. 7, pp. 546–547 (Jul. 1987).

Kirichenko, V. et al., "Specific Charge of the Liquid in Electrohydrodynamic Atomization and Microfilament Forming Processes", *Sov. Phys. Dokl*, vol. 35, No. 12, pp. 1015–1020 (Dec. 1990).

Kirichenko, V. et al., "Transverse Splitting of a Liquid Jet in a Strong Electric Field", *Sov. Phys. Dokl.*, vol. 33, No. 9, pp. 653–654 (Sep. 1988).

Mahajan, S. et al., "Fibrillation Behavior of Oriented Tapes of Polyethylene and Its Blends. IV", *Jour. of Applied Polymer Science*, vol. 60, pp. 1551–1560 (1996).

Marijnissen, J., "Electrosprays with Applications in Aerosol Technology and Material Synthesis", 1994 International Aerosol Conference Tutorial Sessions, Los Angeles, California, pp. 1–67 (Aug. 29, 1994).

Maslowski, E. et al., "New Processes for Fiber–Like PE Structures", *Fiber World*, pp. 12–14 (Mar. 1987).

National Textile Center, "Electrostatic Spinning and Properties of Ultrafine Fibers", http://www.ntcresearch.org/currently/year8/M98–DO1.htm, last updated May 19, 1999, pp. 1–4.

Ohzawa, Y. et al., "Studies on Dry Spinning. 1. Fundamental Equations", *Jour. of Applied Polymer Science*vol. 13, pp. 257–283 (1969).

Ohzawa, Y. et al., "Studies on Dry Spinning. II. Numerical Solutions for Some Polymer–Solvent Systems Based on the Assumption that Drying is Controlled by Boundary–Layer Mass Transfer" *Jour. of Applied Polymer Science*, vol. 14, pp. 1879–1899 (1970).

Petryanov, I. et al., "Adhesion of Finely Dispersed Particles to the Surface of Coating Materials", *Translated from Doklady Akademii Nauk SSSR*, vol. 288, No. 5, pp. 515–551, Original Article submitted Jul. 3, 1985.

SBCCOM–Natick Public Affairs, "Army Teams with Universities to Develop Electrospun Membranes and Fabrics for Soldier Protection", http://www.Natick.army.mil/pao/1998/98–26.htm, last updated 0/27/00, pp. 1–2.

Shambaugh, R., "A Macroscopic View of the Melt–Blowing Process for Producing Microfibers", *Ind. Eng. Chem. Res.*, vol. 27, No. 12, pp. 2363–2372 (1988).

Shepelev, A. et al., "Polymeric Fiber Materials for Fine Cleaning of Gases", *J. Aerosol Sci., Suppl. 1*, vol. 26, pp. 5919–5920, (1995).

Shieh, J. et al., "Preparation of N–Methylol Nylon–6 Membranes for Pervaporation of Ethanol–Water Mixtures" *Department of Chemical Engineering, University of Waterloo, Ontario N2L 3G1, Canada*, pp. 855–863 (Received Jun. 24, 1996).

Sioen, J., "The Coating Company of the Future", *Jour. ofCoated Fabrics*, vol. 28, pp. 73–79 (Jul. 1998).

Smith, J., "Cellulose Acetate Fibrets: a Fibrillated Pulp with High Surface Area", *Tappi Journal*, pp. 185–193 (Dec. 1988).

Smith, R. et al., "Phase Behavior and Reaction of Nylon 6/6 in Water at High Temperatures and Pressures" *Jour. of Applied Polymer Science*, vol. 76, pp. 1062–1073 (2000).

"Survey of Soluble Polyamide Patents", RT–2488–R, pp. 1–6 (Oct. 14, 1954).

Taylor, G., "Viscosity and Molecular Weight of Nylon, The Relation of the Viscosity of Nylon Solutions in Formic Acid to Molecular Weight as Determined by End–Group Measurements", *Contribution from the Chemical Department, Experimental Station, E.I. Du Pont De Nemours & Company*, pp. 635–637 (Mar. 1947).

Wadsworth, L. et al., "Development of Highly Breathable and Effective Blood/Viral Barrier Laminates of Microporous Films, Staple Fibers and Nonwovens", *Jour. of Coated Fabrics*, vol. 28, pp. 12–28 (Jul. 1998).

Wang, F. et al. "Hydrogen Bonding in Polyamide Toughened Novolac Type Phenolic Resin", *Jour. of Applied Polymer Science*, vol. 74, pp. 2283–2289 (1999).

Wang, H. et al., "Synthesis and Properties of Nylon 6 Modified with Various Aromatic Polyamides" *Jour. of Applied Polymer Science*, vol. 68, pp. 1031–1043 (1998).

Wente, V., "Superfine Thermoplastic Fibers", *Industrial and Bio_Chemistry*, Naval Research Laboratory, Washington 25, D.C., vol. 48, No. 8, pp. 1342–1346 (Aug. 1986).

Declaration of Doug Crofoot with Exhibits A and B, dated Sep. 10, 2001.

* cited by examiner

FIG. 3
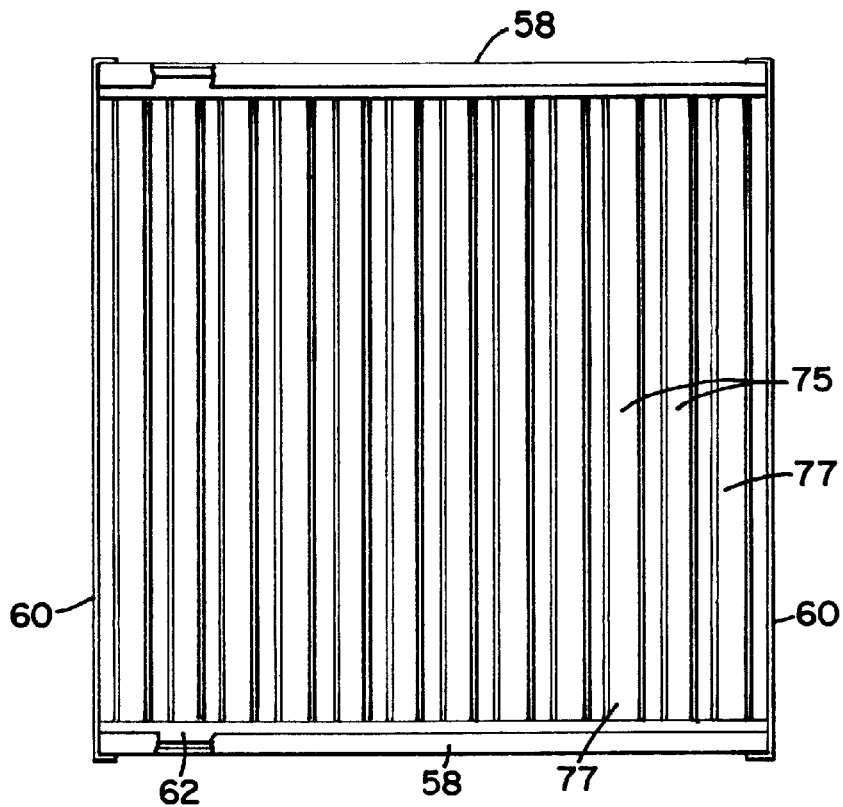
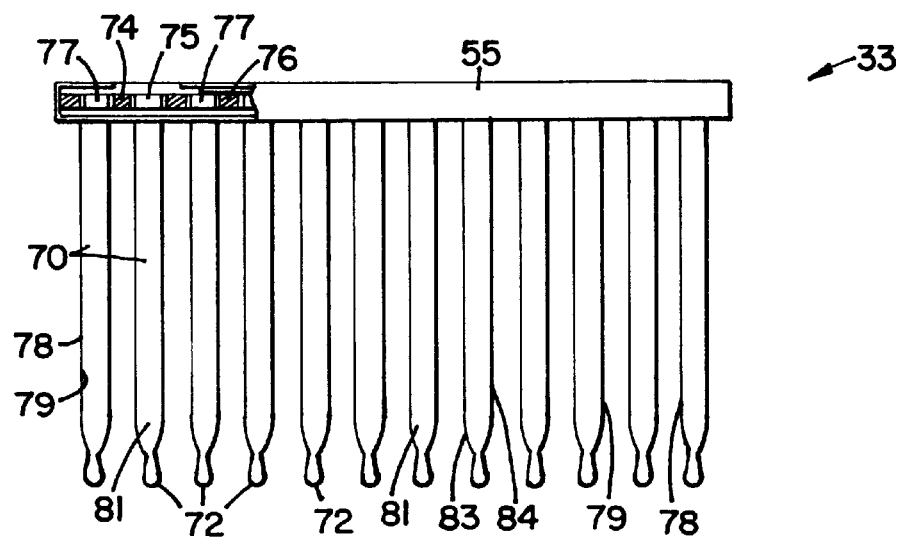
FIG. 4

INDUSTRIAL BAG HOUSE ELEMENTS

RELATED APPLICATION

This application claims priority under 35 U.S.C. §119(e) to U.S. provisional application Ser. No. 60/230,138, filed on Sep. 5, 2000, incorporated by reference herein.

FIELD OF THE INVENTION

This disclosure describes a filter construction or structure for filtering a particulate from fluids including a gas or a liquid. More particularly, this disclosure relates to a bag house filter element. Filter elements are used in a bag house to remove entrained particulates typically from gaseous effluents. Bag house filter structures are typically used to treat large volumes of gaseous effluents to remove dust and grit. The invention further relates to filter assemblies, structures and methods. More particularly, the present invention relates to cabinet filter assemblies wherein the filter element includes a series of bags suspended within a cabinet for filtering dust or other particulates from the gaseous effluent. The bags useful in a dust cabinet of the invention can comprise a variety of the structural shapes or configurations. The bag for the filtration element for the cabinet of the invention obtains high filtration efficiency combined with extended lifetime. Bags can comprise filter tubes or sheet-like filter structures with a folded symmetry. Filter housings can contain a large but varied number of bag units depending on the volume of air filtered.

BACKGROUND OF THE INVENTION

Dust collectors, also known as bag houses, are generally used to filter particulate material from industrial effluent or off gas. Once filtered, the cleaned off gas can be vented to the atmosphere or recycled. Such a bag house dust collector structure generally includes one or more flexible filter banks supported within a cabinet or similar structure. In such a filter cabinet and bank, the filter bag is generally secured within the cabinet and maintained in a position such that effluent can efficiently passes through the bag efficiently removing entrained particulates. The filter bag, secured within the cabinet, is typically supported by a structure that maintains the clean airside separate from the dirty airside and supports the filter bag to maintain efficient operation.

BRIEF DISCUSSION OF THE INVENTION

We have found that the efficiency of a bag house element can be maintained or improved and that the overall lifetime of the bag house element can be substantially maintained and improved using a layer of fine fiber (fiber having a maximum dimension of about 0.5 microns) on the bag house element. During filtering operations, particulates that encounter the bag house element are stopped by and are maintained on or in the surface of the filter structure. The buildup of these particulate materials on the surface of the filter can at some point begin to reduce filter life and efficiency of particulate removal. By placing a portion of the fine fiber on opposing sides of the filter element, we have found that the efficiency of the filter is maintained while the lifetime of the filter is substantially increased. A reverse pulse clean step can be used to remove the accumulated particulate and substantially reduce pressure drop.

We have found that the bag houses structures of the invention can take at least two embodiments. In a first embodiment, the fine fiber filter structure can take the form of a porous tubular layer on a tubular bag or member with a sealed end with the fine fiber formed on the surface on which the particulate impacts the bag. The open end of the tubular member can be fitted with a collar encircling the tubular member. The collar can be incorporated in a seal between the tubular member and support structure in a bag house structure. The tubular member can be supported by a support member that can maintain the shape of the bag and prevent collapse. Such members can comprise a variety of structures including a perforated tube or wire mesh.

In a second embodiment, the fine fiber structure can take the form of a porous filter layer on a bag formed from generally rectangular fabric panels that are connected or sealed along opposite edges or seams to separate clean side from a dirty or dusty side. In a preferred embodiment a single generally rectangular elongated strip fabric is folded along a bisecting lower edge forming a folded structure with the fine fiber formed on the surface on which the particulate impacts the bag. A substantially U-shaped metal clip can extend along of the lower edge of each bag and sides of the shim member or clipped together to clamp the lower edge of the bag therebetween. The purpose of this member is to provide sufficient weight at the lower edge of the bag to maintain it in the vertical position and to prevent portions of the bag being drawn upwardly by the effect of the gas passing through the bag and the differential pressures therein. A wire mesh or other suitable materials is enclosed within the interior of the bags to prevent the panels from collapsing and to ensure that the surface of each bag is subject to gas transfer. A collar is positioned on the upper surface or end of each bag. Such a collar is used to ensure that the bag is sealed to the cabinet for proper and efficient filtering operations. In this application the term "unchanged for filtration purposes" refers to maintaining sufficient efficiency to remove particulate from the fluid stream as is necessary for the selected application.

The invention also relates to polymer materials that can be manufactured with improved environmental stability to heat, humidity, reactive materials and mechanical stress. Such materials can be used in the formation of fine fibers such as microfibers and nanofiber materials with improved stability and strength. As the size of fiber is reduced the survivability of the materials is increasingly more of a problem. Such fine fibers are useful in a variety of applications. In one application, filter structures can be prepared using this fine fiber technology. The invention relates to polymers, polymeric composition, fiber, filters, filter constructions, and methods of filtering. Applications of the invention particularly concern filtering of particles from fluid streams, for example from air streams and liquid (e.g. non-aqueous and aqueous) streams. The techniques described concern structures having one or more layers of fine fibers in the filter media. The compositions and fiber sizes are selected for a combination of properties and survivability.

BRIEF DESCRIPTION OF THE DRAWINGS

FIG. 3 is a sectional view of the apparatus of FIG. 2, taken along the lines 3—3 therein;

FIG. 4 is a side elevational view of the apparatus of FIG. 3;

DETAILED DISCUSSION OF THE INVENTION

Figure 1:
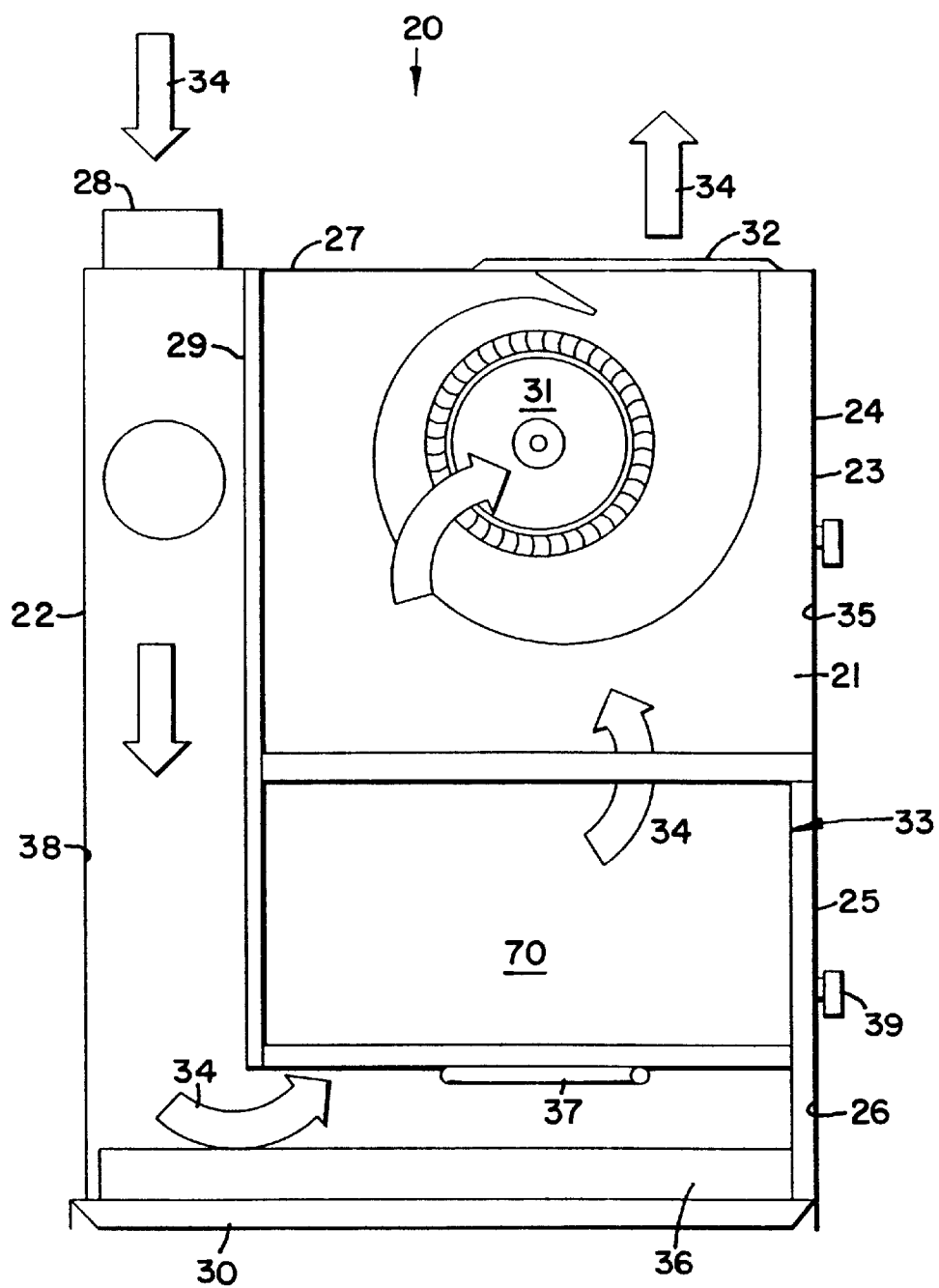
FIG. 1 is a schematic view of a bag house dust collector in operation.
Figure 2:
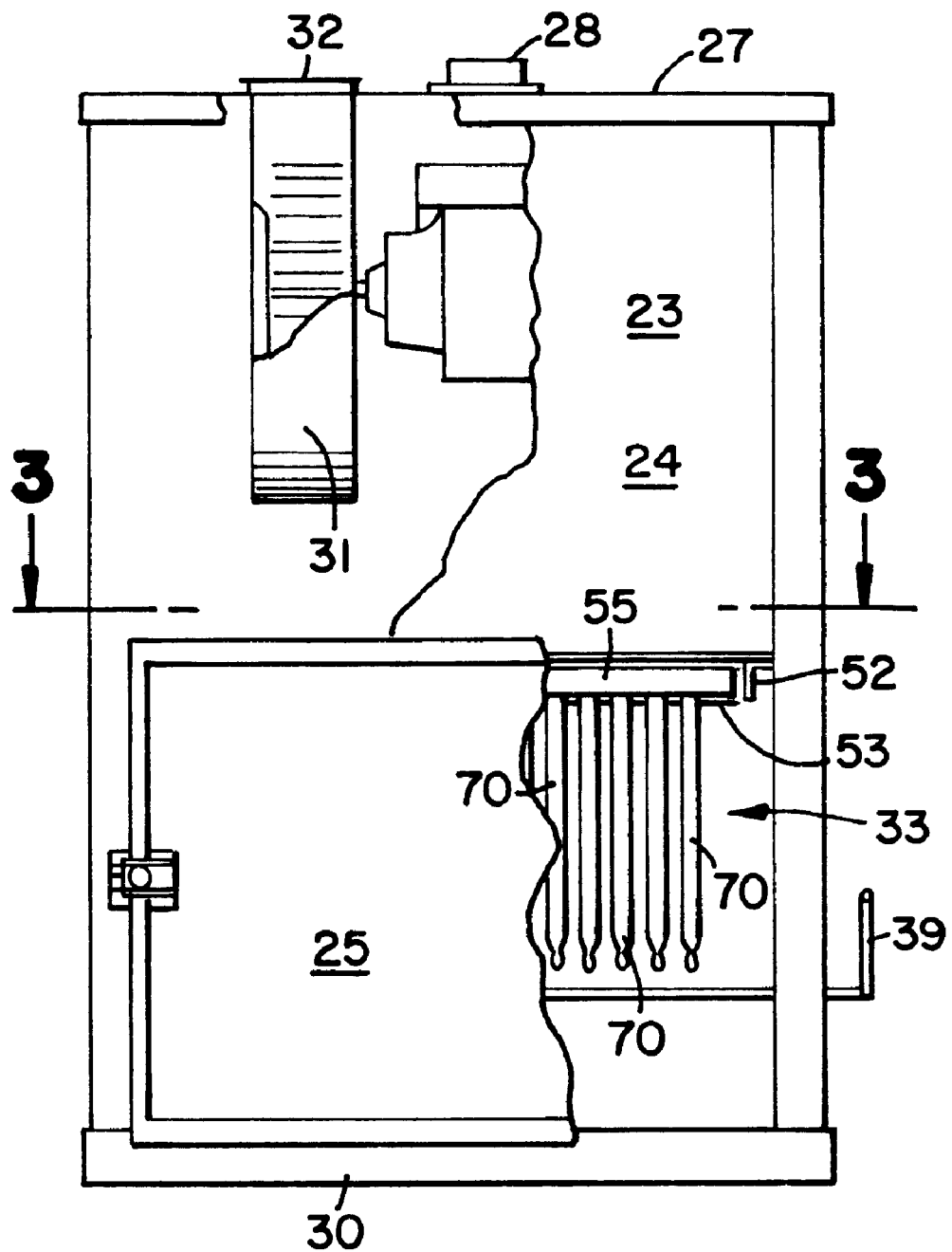
FIG. 2 is a side elevational view of the filtering apparatus of FIG. 1, with parts broken away.

The invention relates to filtering apparatus and to improved filtering structures containing a plurality of filter elements that can be readily changed to maintain and improve the filtering operations or capacity of the unit. The filter structure can be formed in a variety of geometries depending on air flow rate and dust particulate. The filter structure of the invention is formed using a housing that encloses the filtering apparatus, the housing having means to move air through the housing incorporated with the housing and filter structure. The housing is adapted to conduct an air stream having an entrained particulate from a place of particulate generation through the housing returning the cleaned air stream, with particulates removed, either to the original area or to the exterior environment. In large part, the filter structure of the invention is generally applied to dust removal from air streams produced in industrial operations. Increased attention to air pollution and a strong desire to remove dust, dirt, grit and other particulates from an air or other waste gas stream before returning the stream to a site location of generation or into the ambient atmosphere. Currently, environmental requirements are stringent and are expected to increase. A substantial need to increase the capacity, efficiency, and ease of maintenance of bag filtration housings is an important goal. Such bag houses can contain a variety of filter elements in the form of filter bags. Such filter bags are often formed in a tubular format in a folded sheet-like format in which the bags are introduced into a housing such that the bags are sealed. In the operation of such bag houses, air laden with a particulate passes into the housing and contacts the exterior of the bag and passes through the bag with clean air exiting from the interior of the bag construction. Dust typically collects on the exterior surface of the bag.

The fine fibers that comprise the micro-or nanofiber containing layer of the invention can have a diameter of about 0.001 to 2 micron, preferably 0.05 to 0.5 micron. The thickness of the typical fine fiber filtration layer ranges from about 1 to 100 times the fiber diameter with a basis weight ranging from about 0.01 to 240 micrograms-cm$^{-2}$.

Fluid streams such as air and gas streams often carry particulate material therein. The removal of some or all of the particulate material from the fluid stream is needed. For example, air intake streams to the cabins of motorized vehicles, air in computer disk drives, HVAC air, clean room ventilation and applications using filter bags, barrier fabrics, woven materials, air to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings to the various mechanisms involved. In other instances, production gases or off gases from industrial processes or engines may contain particulate material therein. Before such gases can be, or should be, discharged through various downstream equipment to the atmosphere, it may be desirable to obtain a substantial removal of particulate material from those streams.

A general understanding of some of the basic principles and problems of air filter design can be understood by consideration of the following types of filter media: surface loading media; and, depth media. Each of these types of media has been well studied, and each has been widely utilized. Certain principles relating to them are described, for example, in U.S. Pat. Nos. 5,082,476; 5,238,474; and 5,364,456. The complete disclosures of these three patents are incorporated herein by reference.

The "lifetime" of a filter is typically defined according to a selected limiting pressure drop across the filter. The pressure buildup across the filter defines the lifetime at a defined level for that application or design. Since this buildup of pressure is a result of load, for systems of equal efficiency a longer life is typically directly associated with higher capacity. Efficiency is the propensity of the media to trap, rather than pass, particulates. It should be apparent that typically the more efficient a filter media is at removing particulates from a gas flow stream, in general the more rapidly the filter media will approach the "lifetime" pressure differential (assuming other variables to be held constant). The fine fiber layers formed on the substrate in the filters of the invention should be substantially uniform in both filtering performance and fiber location. By substantial uniformity, we mean that the fiber has sufficient coverage of the substrate to have at least some measurable filtration efficiency throughout the covered substrate. Adequate filtration can occur with wide variation in fiber add-on. Accordingly, the fine fiber layers can vary in fiber coverage, basis weight, layer thickness or other measurement of fiber add-on and still remain well within the bounds of the invention. Even a relatively small add-on of fine fiber can add efficiency to the overall filter structure.

In making non-woven fine fiber filter media, a variety of materials have been used including fiberglass, metal, ceramics and a wide range of polymeric compositions. A variety of techniques have been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

The invention provides an improved polymeric material. This polymer has improved physical and chemical stability. The polymer fine fiber (microfiber and nanofiber) can be fashioned into useful product formats. Nanofiber is a fiber with diameter less than 200 nanometer or 0.2 micron. Microfiber is a fiber with diameter larger than 0.2 micron, but not larger than 10 microns. This fine fiber can be made in the form of an improved multi-layer microfiltration media structure. The fine fiber layers of the invention comprise a random distribution of fine fibers which can be bonded to form an interlocking net. Filtration performance is obtained largely as a result of the fine fiber barrier to the passage of particulate. Structural properties of stiffness, strength, pleatability are provided by the substrate to which the fine fiber adhered. The fine fiber interlocking networks have as important characteristics, fine fibers in the form of microfibers or nanofibers and relatively small spaces between the fibers. Such spaces typically range, between fibers, of about 0.01 to about 25 microns or often about 0.1 to about 10 microns. The filter products comprising a fine fiber layer and a substrate layer are thin with a choice of appropriate substrate. The fine fiber adds less than a micron in thickness to the overall fine fiber plus substrate filter media. In service, the filters can stop incident particulate from passing through the fine fiber layer and can attain substantial surface loadings of trapped particles. The particles comprising dust or other incident particulates rapidly form a dust cake on the fine fiber surface and maintains high initial and overall efficiency of particulate removal. Even with relatively fine contaminants having a particle size of about 0.01 to about 1 micron, the filter media comprising the fine fiber has a very high dust capacity.

The polymer materials as disclosed herein have substantially improved resistance to the undesirable effects of heat, humidity, high flow rates, reverse pulse cleaning, operational abrasion, submicron particulates, cleaning of filters in use and other demanding conditions. The improved microfiber and nanofiber performance is a result of the improved character of the polymeric materials forming the microfiber or nanofiber. Further, the filter media of the invention using the improved polymeric materials of the invention provides a number of advantageous features including higher efficiency, lower flow restriction, high durability (stress related or environmentally related) in the presence of abrasive particulates and a smooth outer surface free of loose fibers or fibrils. The overall structure of the filter materials provides an overall thinner media allowing improved media area per unit volume, reduced velocity through the media, improved media efficiency and reduced flow restrictions.

A preferred mode of the invention is a polymer blend comprising a first polymer and a second, but different polymer (differing in polymer type, molecular weight or physical property) that is conditioned or treated at elevated temperature. The polymer blend can be reacted and formed into a single chemical specie or can be physically combined into a blended composition by an annealing process. Annealing implies a physical change, like crystallinity, stress relaxation or orientation. Preferred materials are chemically reacted into a single polymeric specie such that a Differential Scanning Calorimeter analysis reveals a single polymeric material. Such a material, when combined with a preferred additive material, can form a surface coating of the additive on the microfiber that provides oleophobicity, hydrophobicity or other associated improved stability when contacted with high temperature, high humidity and difficult operating conditions. The fine fiber of the class of materials can have a diameter of 2 microns to less than 0.01 micron. Such microfibers can have a smooth surface comprising a discrete layer of the additive material or an outer coating of the additive material that is partly solubilized or alloyed in the polymer surface, or both. Preferred materials for use in the blended polymeric systems include nylon 6; nylon 66; nylon 6-10; nylon (6-66-610) copolymers and other linear generally aliphatic nylon compositions. A preferred nylon copolymer resin (SVP-651) was analyzed for molecular weight by the end group titration. (J. E. Walz and G. B. Taylor, determination of the molecular weight of nylon, Anal. Chem. Vol. 19, Number 7, pp 448–450 (1947). A number average molecular weight ($W_n$) was between 21,500 and 24,800. The composition was estimated by the phase diagram of melt temperature of three component nylon, nylon 6 about 45%, nylon 66 about 20% and nylon 610 about 25%. (Page 286, Nylon Plastics Handbook, Melvin Kohan ed. Hanser Publisher, New York (1995)).

Reported physical properties of SVP 651 resin are:

| -Property | ASTM Method | Units | Typical Value |
|---|---|---|---|
| Specific Gravity | D-792 | — | 1.08 |
| Water Absorption (24 hr immersion) | D-570 | % | 2.5 |
| Hardness | D-240 | Shore D | 65 |
| Melting Point | DSC | ° C. (° F.) | 154 (309) |
| Tensile Strength @ Yield | D-638 | MPa (kpsi) | 50 (7.3) |
| Elongation at Break | D-638 | % | 350 |
| Flexural Modulus | D-790 | MPa (kpsi) | 180 (26) |
| Volume Resistivity | D-257 | ohm-cm | $10^{12}$ |

A polyvinylalcohol having a hydrolysis degree of from 87 to 99.9+% can be used in such polymer systems. These are preferably cross linked. And they are most preferably crosslinked and combined with substantial quantities of the oleophobic and hydrophobic additive materials.

Another preferred mode of the invention involves a single polymeric material combined with an additive composition to improve fiber lifetime or operational properties. The preferred polymers useful in this aspect of the invention include nylon polymers, polyvinylidene chloride polymers, polyvinylidene fluoride polymers, polyvinylalcohol polymers and, in particular, those listed materials when combined with strongly oleophobic and hydrophobic additives that can result in a microfiber or nanofiber with the additive materials formed in a coating on the fine fiber surface. Again, blends of similar polymers such as a blend of similar nylons, similar polyvinylchloride polymers, blends of polyvinylidene chloride polymers are useful in this invention. Further, polymeric blends or alloys of differing polymers are also contemplated by the invention. In this regard, compatible mixtures of polymers are useful in forming the microfiber materials of the invention. Additive composition such a fluoro-surfactant, a nonionic surfactant, low molecular weight resins (e.g.) tertiary butylphenol resin having a molecular weight of less than about 3000 can be used. The resin is characterized by oligomeric bonding between phenol nuclei in the absence of methylene bridging groups. The positions of the hydroxyl and the tertiary butyl group can be randomly positioned around the rings. Bonding between phenolic nuclei always occurs next to hydroxyl group, not randomly. Similarly, the polymeric material can be combined with an alcohol soluble non-linear polymerized resin formed from bis-phenol A. Such material is similar to the tertiary butylphenol resin described above in that it is formed using oligomeric bonds that directly connect aromatic ring to aromatic ring in the absence of any bridging groups such as alkylene or methylene groups.

Polymeric materials have been fabricated in non-woven and woven fabrics, fibers and microfibers. The polymeric material provides the physical properties required for product stability. These materials should not change significantly in dimension, suffer reduced molecular weight, become less flexible or subject to stress cracking or physically deteriorate in the presence of sunlight, humidity, high temperatures or other negative environmental effects. The invention relates to an improved polymeric material that can maintain physical properties in the face of incident electromagnetic radiation such as environmental light, heat, humidity and other physical challenges.

Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon caprolactam in the presence of a small amount of water. This reaction forms a nylon-6 (made from a cyclic lactam—also known as episilon-aminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is a ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene(ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. For 0.2-micron fiber with 10% additive level, the surface thickness is calculated to be around 50 Å if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt. %. Oligomeric additives that can be used in combination with the polymer materials of the invention include oligomers having a molecular weight of about 500 to about 5000, preferably about 500 to about 3000 including fluorochemicals, nonionic surfactants and low molecular weight resins or oligomers.

Fluoro-organic wetting agents useful in this invention are organic molecules represented by the formula $$R_f\text{-}G$$

wherein $R_f$ is a fluoroaliphatic radical and G is a group which contains at least one hydrophilic group such as cationic, anionic, nonionic, or amphoteric groups. Nonionic materials are preferred. $R_f$ is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. Preferably, $R_f$ contains about 2 to 8 carbon atoms.

The cationic groups that are usable in the fluoro-organic agents employed in this invention may include an amine or a quaternary ammonium cationic group which can be oxygen-free (e.g., $-NH_2$) or oxygen-containing (e.g., amine oxides). Such amine and quaternary ammonium cationic hydrophilic groups can have formulas such as $-NH_2$, $-(NH_3)X$, $-(NH(R^2)_2)X$, $-(NH(R^2)_3)X$, or $-N(R_2)_2\rightarrow O$, where x is an anionic counterion such as halide, hydroxide, sulfate, bisulfate, or carboxylate, $R^2$ is H or $C_{1-18}$ alkyl group, and each $R^2$ can be the same as or different from other $R^2$ groups. Preferably, $R^2$ is H or a $C_{1-16}$ alkyl group and X is halide, hydroxide, or bisulfate.

The anionic groups which are usable in the fluoro-organic wetting agents employed in this invention include groups which by ionization can become radicals of anions. The anionic groups may have formulas such as $-COOM$, $-SO_3M$, $-OSO_3M$, $-PO_3HM$, $-OPO_3M_2$, or $-OPO_3HM$, where M is H, a metal ion, $(NR_4^1)^+$, or $(SR_4^1)^+$, where each $R^1$ is independently H or substituted or unsubstituted $C_1$-$C_6$ alkyl. Preferably M is $Na^+$ or $K^+$. The preferred anionic groups of the fluoro-organo wetting agents used in this invention have the formula $-COOM$ or $-SO_3M$. Included within the group of anionic fluoro-organic wetting agents are anionic polymeric materials typically manufactured from ethylenically unsaturated carboxylic mono- and diacid monomers having pendent fluorocarbon groups appended thereto. Such materials include surfactants obtained from 3M Corporation known as FC-430 and FC-431.

The amphoteric groups which are usable in the fluoro-organic wetting agent employed in this invention include groups which contain at least one cationic group as defined above and at least one anionic group as defined above.

The nonionic groups which are usable in the fluoro-organic wetting agents employed in this invention include groups which are hydrophilic but which under pH conditions of normal agronomic use are not ionized. The nonionic groups may have formulas such as $-O(CH_2CH_2)xOH$ where x is greater than 1, $-SO_2NH_2$, $-SO_2NHCH_2CH_2OH$, $-SO_2N(CH_2CH_2H)_2$, $-CONH_2$, $-CONHCH_2CH_2OH$, or $-CON(CH_2CH_2OH)_2$. Examples of such materials include materials of the following structure:

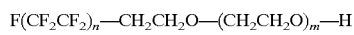

wherein n is 2 to 8 and m is 0 to 20.

Other fluoro-organic wetting agents include those cationic fluorochemicals described, for example in U.S. Pat. Nos. 2,764,602; 2,764,603; 3,147,064 and 4,069,158. Such amphoteric fluoro-organic wetting agents include those amphoteric fluorochemicals described, for example, in U.S. Pat. Nos. 2,764,602; 4,042,522; 4,069,158; 4,069,244; 4,090,967; 4,161,590 and 4,161,602. Such anionic fluoro-organic wetting agents include those anionic fluorochemicals described, for example, in U.S. Pat. Nos. 2,803,656; 3,255,131; 3,450,755 and 4,090,967.

Examples of such materials are duPont Zonyl FSN and duPont Zonyl FSO nonionic surfactants. Another aspect of additives that can be used in the polymers of the invention include low molecular weight fluorocarbon acrylate materials such as 3M's Scotchgard material having the general structure:

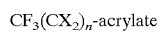

wherein X is $-F$ or $-CF_3$ and n is 1 to 7.

Further, nonionic hydrocarbon surfactants including lower alcohol ethoxylates, fatty acid ethoxylates, nonylphenol ethoxylates, etc. can also be used as additive materials for the invention. Examples of these materials include Triton X-100 and Triton N-101.

A useful material for use as an additive material in the compositions of the invention are tertiary butylphenol oligomers. Such materials tend to be relatively low molecular weight aromatic phenolic resins. Such resins are phenolic polymers prepared by enzymatic oxidative coupling. The absence of methylene bridges result in unique chemical and physical stability. These phenolic resins can be crosslinked with various amines and epoxies and are compatible with a variety of polymer materials. These materials are generally exemplified by the following structural formulas which are characterized by phenolic materials in a repeating motif in the absence of methylene bridge groups having phenolic and aromatic groups.

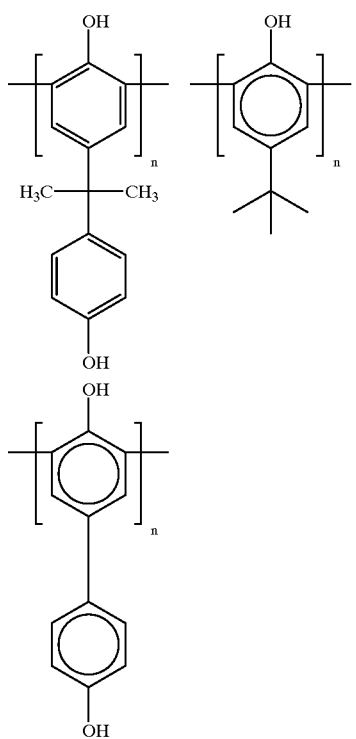

wherein n is 2 to 20. Examples of these phenolic materials include Enzo-BPA, Enzo-BPA/phenol, Enzo-TBP, Enzo-COP and other related phenolics were obtained from Enzymol International Inc., Columbus, Ohio.

It should be understood that an extremely wide variety of fibrous filter media exist for different applications. The durable nanofibers and microfibers described in this invention can be added to any of the media. The fibers described in this invention can also be used to substitute for fiber components of these existing media giving the significant advantage of improved performance (improved efficiency and/or reduced pressure drop) due to their small diameter, while exhibiting greater durability.

Polymer nanofibers and microfibers are known, however their use has been very limited due to their fragility to mechanical stresses, and their susceptibility to chemical degradation due to their very high surface area to volume ratio. The fibers described in this invention address these limitations and will therefore be usable in a very wide variety of filtration, textile, membrane and other diverse applications.

A particularly preferred material of the invention comprises a microfiber material having a dimension of about 2 to 0.01 microns. The most preferred fiber size range between 0.05 to 0.5 micron. Such fibers with the preferred size provide excellent filter activity, ease of back pulse cleaning and other aspects. The highly preferred polymer systems of the invention have adhering characteristic such that when contacted with a cellulosic substrate adheres to the substrate with sufficient strength such that it is securely bonded to the substrate and can resist the delaminating effects of a reverse pulse cleaning technique and other mechanical stresses. In such a mode, the polymer material must stay attached to the substrate while undergoing a pulse clean input that is substantially equal to the typical filtration conditions except in a reverse direction across the filter structure. Such adhesion can arise from solvent effects of fiber formation as the fiber is contacted with the substrate or the post treatment of the fiber on the substrate with heat or pressure. However, polymer characteristics appear to play an important role in determining adhesion, such as specific chemical interactions like hydrogen bonding, contact between polymer and substrate occurring above or below Tg, and the polymer formulation including additives. Polymers plasticized with solvent or steam at the time of adhesion can have increased adhesion.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. One aspect of the filter media of the invention is a test of the ability of the filter media to survive immersion in warm water for a significant period of time. The immersion test can provide valuable information regarding the ability of the fine fiber to survive hot humid conditions and to survive the cleaning of the filter element in aqueous solutions that can contain substantial proportions of strong cleaning surfactants and strong alkalinity materials. Preferably, the fine fiber materials of the invention can survive immersion in hot water while retaining at least 50% of the fine fiber formed on the surface of the substrate. Retention of at least 50% of the fine fiber can maintain substantial fiber efficiency without loss of filtration capacity or increased back pressure. Most preferably retaining at least 75%.

A fine fiber filter structure includes a bi-layer or multi-layer structure wherein the filter contains one or more fine fiber layers combined with or separated by one or more synthetic, cellulosic or blended web or substrate. Another preferred motif is a structure including fine fiber in a matrix or blend of other fibers. The filter bag assembly of the invention, after test exposure for a test period of 16 hours to test conditions of 140° F. air and a relative humidity of 100% retains greater than 30% of the fiber unchanged for filtration purposes.

We believe important characteristics of the fiber and microfiber layers in the filter structure relate to temperature resistance, humidity or moisture resistance and solvent resistance, particularly when the microfiber is contacted with humidity, moisture or a solvent at elevated temperatures. Further, a second important property of the materials of the invention relates to the adhesion of the material to a substrate structure. The microfiber layer adhesion is an important characteristic of the filter material such that the material can be manufactured without delaminating the microfiber layer from the substrate, the microfiber layer plus substrate can be processed into a filter structure including pleats, rolled materials and other structures without significant delamination. We have found that the heating step of the manufacturing process wherein the temperature is raised to a temperature at or near but just below melt temperature of one polymer material, typically lower than the lowest melt temperature substantially improves the adhesion of the fibers to each other and the substrate. At or above the melt temperature, the fine fiber can lose its fibrous structure. It is also critical to control heating rate. If the fiber is exposed to its crystallization temperature for extended period of time, it is also possible to lose fibrous structure. Careful heat treatment also improved polymer properties that result from the formation of the exterior additive layers as additive materials migrate to the surface and expose hydrophobic or oleophobic groups on the fiber surface.

The criteria for performance is that the material be capable of surviving intact various operating fiber or filter temperatures, i.e. a temperature of 140° F., 160° F, 270° F., 300° F. for a period of time of 1 hour or 3 hours, depending on end use, while retaining 30%, 50%, 80% or 90% of filter efficiency. An alternative criteria for performances that the material is capable of surviving intact at various operating temperatures, i.e. temperatures of 140° F., 160° F., 270° F., 300° F., for a period of time of 1 hours or 3 depending on end use, while retaining, depending on end use, 30%, 50%, 80% or 90% of effective fine fibers in a filter layer. Often the temperature of the fiber is kept at about ambient as long as the incident air is passing through the filter at a normal rate. The fiber or filter can be exposed to elevated temperatures when flow is constricted, the ambient air is hot, when the equipment is operating abnormally or the equipment remains at high temperature after air flow is stopped. Survival at these temperatures is important at low humidity, high humidity, and in water saturated air. The microfiber and filter material of the invention are deemed moisture resistant where the material can survive immersion at a temperature of greater than 160° F. while maintaining efficiency for a time greater than about 5 minutes. Similarly, solvent resistance in the microfiber material and the filter material of the invention is obtained from a material that can survive contact with a solvent such as ethanol, a hydrocarbon, a hydraulic fluid, or an aromatic solvent for a period of time greater than about 5 minutes at 70° F. while maintaining 50% efficiency.

The fine fiber materials of the invention can be used in a variety of filter applications including pulse clean and non-pulse cleaned filters for dust collection, gas turbines and engine air intake or induction systems; gas turbine intake or induction systems, heavy duty engine intake or induction systems, light vehicle engine intake or induction systems; Zee filter; vehicle cabin air; off road vehicle cabin air, disk drive air, photocopier-toner removal; HVAC filters in both commercial or residential filtration applications.

As more demanding applications are envisioned for filtration media, significantly improved materials are required to withstand the rigors of high temperature 100° F. to 250° F. and up to 300° F., high humidity 10% to 90% up to 100% RH, high flow rates of both gas and liquid, and filtering micron and submicron particulates (ranging from about 0.01 to over 10 microns) and removing both abrasive and non-abrasive and reactive and non-reactive particulate from the fluid stream.

We have found that there is a critical add-on amount of the fine fiber in this application. The fine fiber is placed onto the substrate an amount obtaining in a single layer of fine fiber an efficiency of about 15% to about 80%. Preferred add-on parameters are as follows, the upper end of the add-on amount of fine fiber would a 0.1–3 micron thick layer of 5% to 40% solidity fiber layer (90% to 60% void fraction). In this case the basis weight is 0.00005 to 0.2 mg-cm$^{-2}$ or 0.00055 to 2 lb.-3000 ft$^{-2}$. (lbs/3000 ft$^{-2}$ is a textile and paper makers standard unit). This add-on amount of fine fiber is less than the typical operational amount but, when placed on both or opposing sides of the filter element, comprises sufficient fine fiber to maintain efficiency and lifetime.

The filter media includes at least a micro- or nanofiber web layer in combination with a substrate material in a mechanically stable filter structure. These layers together provide excellent filtering, high particle capture, efficiency at minimum flow restriction when a fluid such as a gas or liquid passes through the filter media. The substrate can be positioned in the fluid stream upstream, downstream or in an internal layer. A variety of industries have directed substantial attention in recent years to the use of filtration media for filtration, i.e. the removal of unwanted particles from a fluid such as gas or liquid. The common filtration process removes particulate from fluids including an air stream or other gaseous stream or from a liquid stream such as a hydraulic fluid, lubricant oil, fuel, water stream or other fluids. Such filtration processes require the mechanical strength, chemical and physical stability of the microfiber and the substrate materials. The filter media can be exposed to a broad range of temperature conditions, humidity, mechanical vibration and shock and both reactive and non-reactive, abrasive or non-abrasive particulates entrained in the fluid flow. Further, the filtration media often require the self-cleaning ability of exposing the filter media to a reverse pressure pulse (a short reversal of fluid flow to remove surface coating of particulate) or other cleaning mechanism that can remove entrained particulate from the surface of the filter media. Such reverse cleaning can result in substantially improved (i.e.) reduced pressure drop after the pulse cleaning. Particle capture efficiency typically is not improved after pulse cleaning, however pulse cleaning will reduce pressure drop, saving energy for filtration operation. Such filters can be removed for service and cleaned in aqueous or non-aqueous cleaning compositions. Such media are often manufactured by spinning fine fiber and then forming an interlocking web of microfiber on a porous substrate. In the spinning process the fiber can form physical bonds between fibers to interlock the fiber mat into a integrated layer. Such a material can then be fabricated into the desired filter format such as cartridges, flat disks, canisters, panels, bags and pouches. Within such structures, the media can be substantially pleated, rolled or otherwise positioned on support structures.

Such bags can be formed from a variety of conventional fibers including cellulosic fibers such as cotton, hemp or other natural fibers, inorganic fibers including fiberglass fibers or organic fibers such as polyester polymers, nylon polymers, or other conventional fibers or polymeric materials. The filter bag of the invention can be woven or non-woven. In woven bags, the fibers are typically formed into an interlocking mesh of fiber in a typical woven format. Non-woven fabrics are typically made by forming loosely the fibers in no important or particular orientation and then binding the fibers into a filter fabric. One particularly important fabric material comprises felt fabric. Fibers are typically used that exhibit excellent resilience and resistance to the effects of the passage of air and the entrapment of particulates. The fabrics should have stability with respect to chemical particulates, and should be stable with respect to varying temperatures of both the air passing through the bag house and the temperature of the particulate entrained on the filter surface. The tube-like filter and the sheet-like filter bag typically passes the gaseous stream laden with particulate from the exterior through to the interior exiting from the interior of the bag structure. Such an operational scheme places a pressure drop in the direction such that the bag tends to collapse during operation. There are also "inside out bags" that are installed in an inverted orientation and operate with reversed airflow. Dust laden air flows into the interior of the bag and exits through the exterior. In such an application the fiber is placed on the interior of the bag or on both surfaces. Such bags are shaken ofr vibrated for cleaning.

The filter structures of the invention are typically maintained in their useful open shape by supporting the fabric on a suitable support structure typically formed on the interior of the bag. Such supports can be formed from linear members in the form of a wound wire or cage-like structure. Alternatively, the support can comprise a perforated ceramic or metal structure that mimics the shape of the bag. In any event, the support structure should be pervious to the passage of air through the structure and should provide no incremental increase in pressure drop over the filter bag. Such support structures typically are formed such that they contact the entirety of the interior of the filter bag and maintain the filter bag in an efficient filtration shape or confirmation.

In order to maintain or reduce operating pressure drop, the filter bags tend to be pulse cleaned during operation. During pulse cleaning operation, a pulse of air is directed through the filter bag in a direction opposite to normal filtering operations. The effect of the pulse of air has two important results. First, the pulse tends to cause the filter bag to flex in response to the increased internal pressure. Such outward flex movement tends to mechanically remove any build-up of particulate in the form of a filter cake on the exterior of the bag. Further, the increase in air flow in the opposite direction through the surface of the filter bag tends to cause the particulates to be removed by the action of the air passing through the porous openings within the filter bag structure. The important result of the action of the air passing through the bag in an opposite direction during operations tends to reduce the quantity of any particulate or filter cake that forms on the exterior of the filter bag, thus returning the filter bag to a pressure drop that is typically more commensurate with efficient operation of the structure. Such pulse cleaning operations can be performed using a variety of internal structures within the bag house. The bag house can contain internal fans that can direct a stream of air in the opposite direction through the housing structure. Alternatively, the housing can contain an air orifice or spray head that can be installed within the support structure or can be moved from support structure to support structure to introduce a reverse pulse stream of air into the interior of the bag house.

In the operation of the overall filter structure, air typically passes from the air inlet through the bag house structures through an outlet. Commonly, means to cause the movement of air through the housing can comprise a fan, turbine or other air moving apparatus. Commonly, such air movement means are installed in the air outlet to cause air to exit the housing at the outlet, while creating an area of reduced pressure inside the housing causing air to be drawn into the inlet and through the bag house structures. As the air laden with particulate is contacted with the exterior of the filter bags, the particulates are entrained on the exterior of the bag preventing the particulate from exiting the bag house or filter structure. The cleaned air is drawn from the interior of the filter bag through the clean section of the bag house and the cleaned air is then directed to the external environment or back into the operating environment from which the air originated.

The invention relates to filtering apparatus and to improved filtering structures containing a plurality of filter elements that can be readily changed to maintain and improve the filtering operations or capacity of the unit. The filter structure can be formed in a variety of geometries depending on air flow rate and dust particulate. The filter structure of the invention is formed using a housing that encloses the filtering apparatus, the housing having means to move air through the housing incorporated with the housing and filter structure. The housing is adapted to conduct an air stream having an entrained particulate from a place of particulate generation through the housing returning the cleaned air stream, with particulates removed, either to the original area or to the exterior environment. In large part, the filter structure of the invention is generally applied to dust removal from air streams produced in industrial operations. Increased attention to air pollution and a strong desire to remove dust, dirt, grit and other particulates from an air or other waste gas stream before returning the stream to a site location of generation or into the ambient atmosphere. Currently, environmental requirements are stringent and are expected to increase. A substantial need to increase the capacity, efficiency, and ease of maintenance of bag filtration housing is an important goal.

Held within a bag house structure is a bag house element that can have any of the aforementioned structures. The filter element maintained within the structures discussed above are typically porous elements comprising at least a layer of a woven or non-woven fabric along with the fine fiber layer. Fabrics useful in the elements of the invention include both woven and non-woven fabrics made of conventional fiber materials. Common fibers that can be used in the bag house element media include natural fibers such as cotton or wool, along with synthetic fibers such as polyesters, nylons, polyamides, polyolefins and others. One preferred mode of constructing the elements of the invention includes using a felt media. Felt is a non-woven fabric typically the oldest and most well-defined of non-wovens. Typically, felts are considered to be a compressed, porous, non-woven fabric, usually made of a natural or synthetic fiber that is made by laying discrete fibers of the felting material and compressing the felt into a felt layer using commonly available felt bonding technology.

DETAILED DESCRIPTION OF THE DRAWINGS

FIG. 1 illustrates a schematic indicating a typical system in which a filter frame assembly according to the present invention is utilized. In FIG. 1, a bag house air filter is shown generally at 20. Bag house air filter 20 incorporates an enclosure formed by a side wall 21, a rear wall 22, a front wall 23, and a side wall opposite from side wall 21, removed in this schematic view. A base section 30 closes the bottom of the arrangement. These walls generally form a rectangular closed structure, i.e. a housing or cabinet. The front wall 23 includes first and second door panels 24, 25. In the illustrated schematic view, first and second doors 24, 25 correspond to top and bottom orientations, respectively. The first and second doors 24, 25 may be opened and closed in order to provide access to the interior 26 of the bag house air filter 20.

At the top of the bag house air filter 20, opposite to the base section 30, is a removable top cover member 27 having an inlet passage or port 28 for taking in unfiltered, or dirty air. Within the bag house air filter 20 is a baffle 29 which extends between the side walls and is spaced from the rear wall 22 extending from the upper edge of the walls and toward the lower edge and terminating short of the base section 30 to provide a passage at the rear of the cabinet through which unfiltered air is directed to the interior 26 of the enclosure. Positioned on the top cover member 27 is a motor or blower 31 attached to the top cover member 27. The cover member 27 defines a clean air outlet 32. Positioned within the interior 26 and to the side of the baffle 29 remote from the inlet 28 and beneath the blower 31 is a filter section, indicated generally at 33. Filter section 33 includes a plurality of filter elements to remove dust and other particles from the air.

Air flows in and follows the path shown by arrows 34. That is, the blower 31 creates a vacuum which pulls dirty air in through the inlet 28, down a channel section 38, and to the bottom of the filter section 33. The air then flows through the filter section 33, through the filter elements within the filter section, and into the clean air plenum 35. The clear air is then vented through the outlet 32.

The filter elements 70 within the filter section 33 may include a plurality of cloth bags. In such a system, the dust and other particulate matter is not allowed to pass through the surface of the cloth bag. The dust either falls to the base section and into a pan 36, or it clings to the exterior of the cloth bag. A shaker bar 37 extends across the ends of the cloth bags. Periodically, the shaker bar 37 is actuated, either manually by a pedal 39 or by automation, and the shaker bar 37 knocks the cloth bags up and down in order to remove dust which may have caked on the exterior of the bags 70. In the illustrated embodiment, each of the bags 70 is a generally rectangular bag with substantially parallel walls 83, 84. There may be at least 2, typically 10–100, and no more that 200 filter bags in the housing.

The principles of operation summarized above are described in U.S. Pat. No. 3,733,790 to Pierce, which patent is incorporated by reference herein.

The filter section 33 is mounted on flange members 52 which are suitably attached to the side wall 21 and the opposite side wall of the enclosure through means such as welding, the flange structure having a channel shaped guide portion 53 in which the filter frame is mounted. The filter frame 53 will best be seen in FIGS. 3 and 4 as including channel shaped side frame members 58 and strap type end members 60 suitably connected thereto to form a generally rectangular structure. Positioned in the top of the channel shaped side members 58 are slots 62 through which filter elements are inserted and removed, as will be hereinafter noted. The filter elements are indicated at 70 as including a plurality of bag type elements closed at the mounted extremity as by clip 72 and having a mounting bracket 74 at the opposite extremity which are held within and between the channel shaped frame sides 58 of the filter frame. These are inserted through the slot 62 in the upper part of the frame and are spaced apart by block type spacer members 75 such that an airtight seal is obtained between the individual filter elements 70. A gasket or other suitable stripping 76 is positioned on top of the spacers and filter mounting ends 74 to secure the filter bag elements in the frame in an airtight and motion tight arrangement. As can be seen in FIG. 4, each of the bags 70 has a clean-air opening 77 through which air, after it has passed through the bag material from an upstream side 78 to a downstream side 79 (in the bag interior), will exit through to the outlet 32. The clean air opening 77 communicates with the interior volume 81 of the bags 70.

The number of filter elements 70 may be varied by reducing or increasing the size and number of the spacers to vary the capacity of the filter. The filter elements 70 are mounted in the enclosure in the channel shaped frame part 53 of the flange section 52 to slide therein filling the area within the enclosure defined by the door 25 or front wall 23, the side walls 21 and the baffle section 29. The filter elements 70 are substantially the same width dimensions as the distance between the front of the enclosure and the baffle section 29 and are mounted in spaced parallel relationship to define a continuous filter surface through which inlet or unfiltered air flow must pass to be drawn by the blower 31 into the inlet of the same and discharges through the outlet 27 thereof.

In the operation of the filtering apparatus, energization of the blower 31 will cause air flow through the inlet in the top enclosure 27 through inlet 28 to one side of the enclosure defined by the baffle divider 29 and the rear wall 22. This air flow will be directed around the end of the baffle 29 and through the filter section 33. The dirty air flows through the individual element 70 by passing through the upstream side 78 into the downstream side 79, and out through the clean air apertures 77. The cleaned air is drawn out of the enclosure by the blower 31 which discharges filtered air at the grill or outlet 32 of the top cover. Dirt is removed from the filter section by agitating the same through operation of the pedal 39 on the shaker 37 causing the filters 70 to shake. Dust and dirt deposited on the surface of the filters 70 will be shaken therefrom and allowed to drop to the base 30 of the enclosure wherein it may be removed manually by access through the door section 25.

Figure 5:
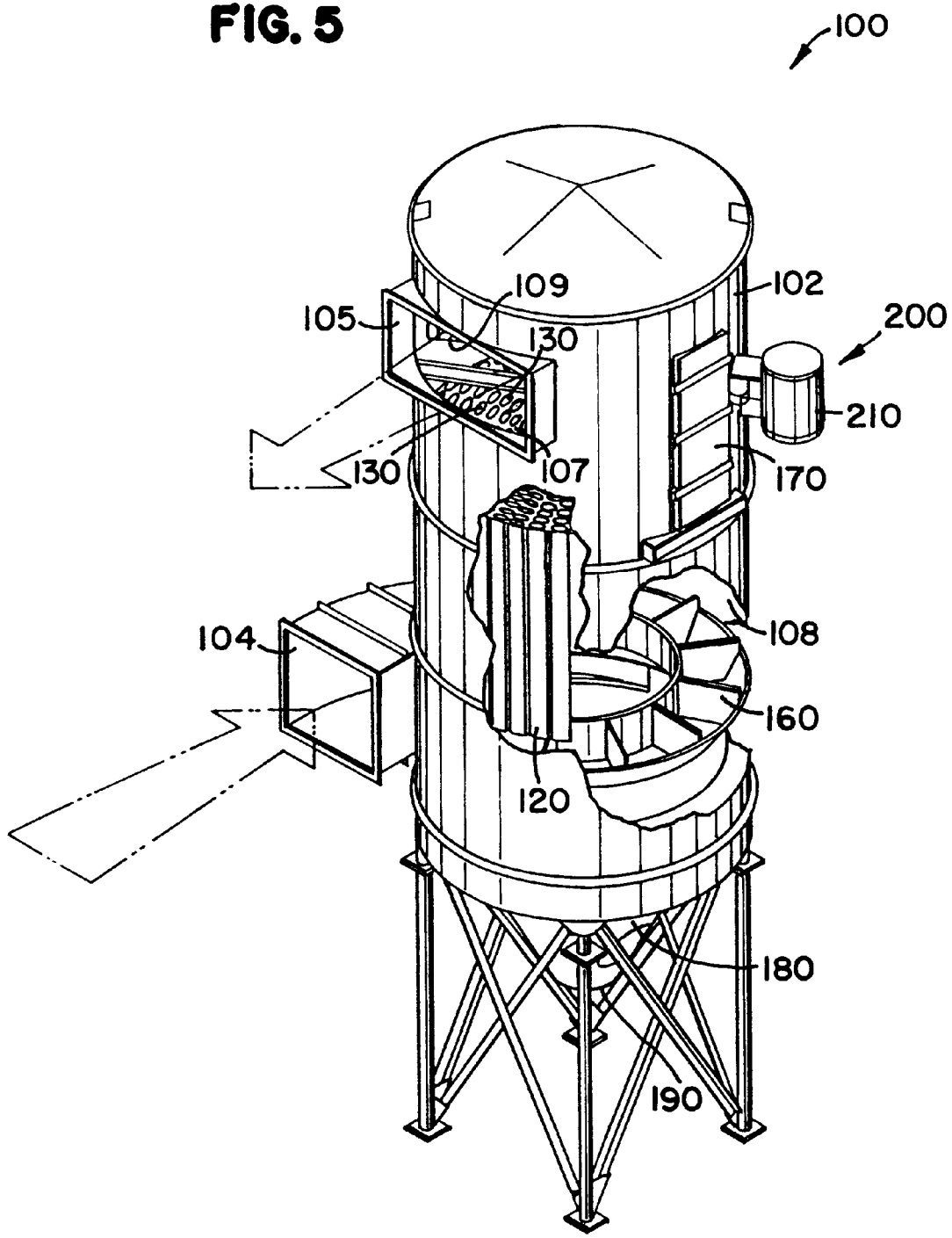
FIG. 5 is a schematic, perspective view of another embodiment of a bag house dust collector, portions being broken away to show internal detail.
Figure 6:
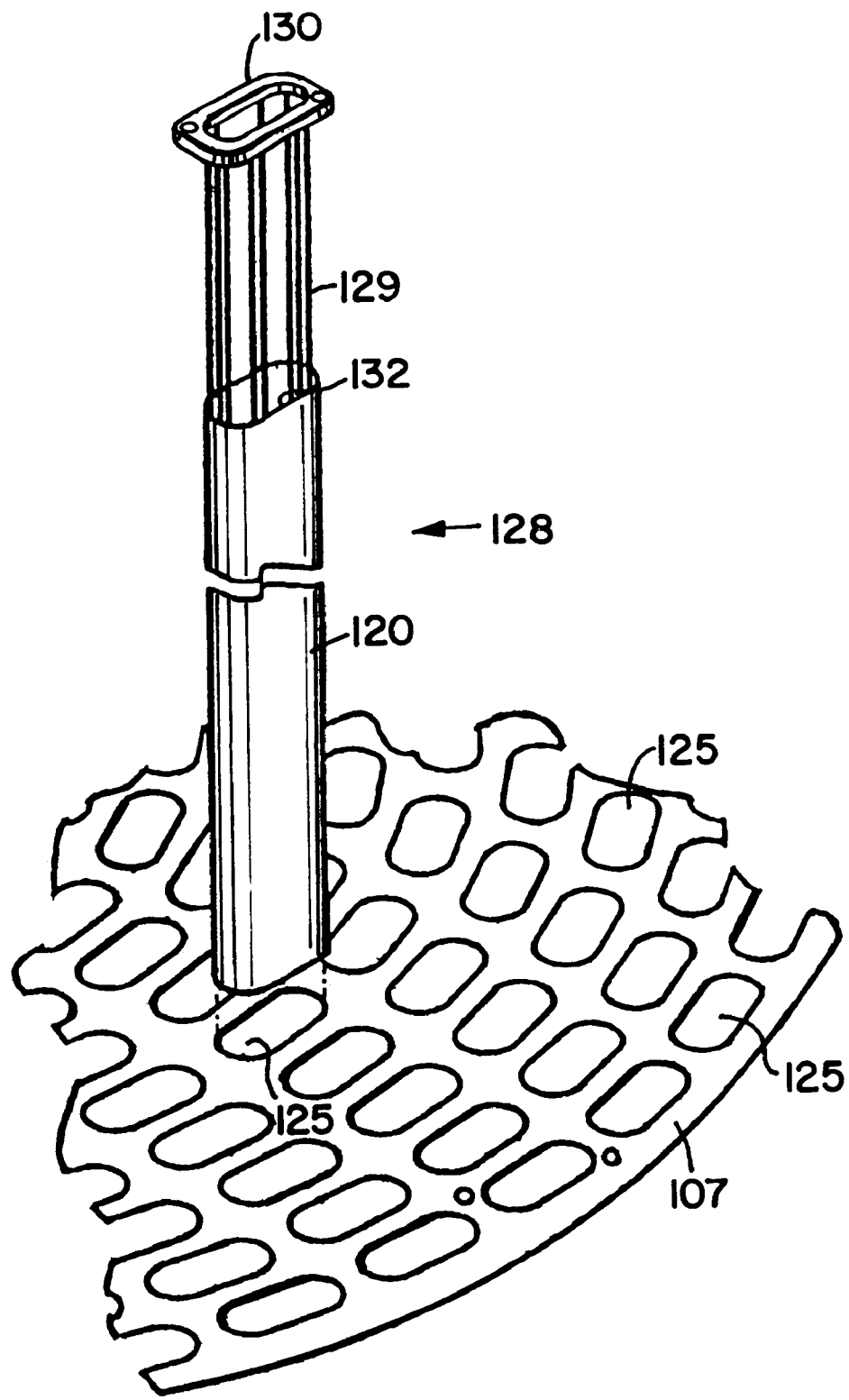
FIG. 6 is an exploded, fragmented, schematic view of a filter tube, filter tube frame, tube flange, and tube sheet used in the bag house of FIG. 5.
Figure 7:
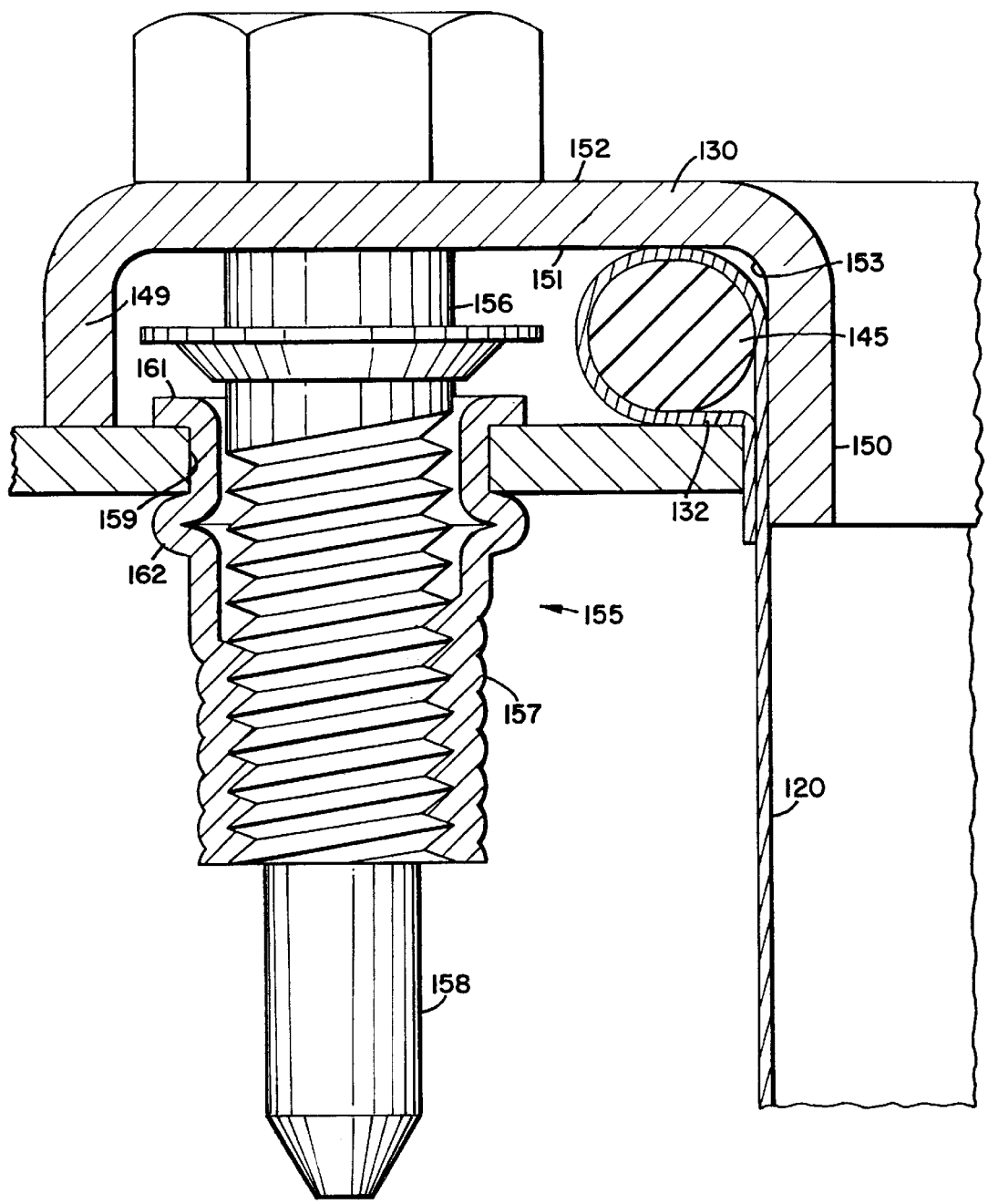
FIG. 7 is an enlarged, fragmented, cross-sectional view depicting the filter tube, filter tube frame, tube flange, and tube sheet assembled together.

In FIGS. 5–7, another embodiment of a bag house filter assembly is provided. In FIG. 5, the dust collector 100, which is depicted with portions broken away, includes an outer housing 102 having a dirty air inlet 104 and a clean air outlet 105. Tube sheet 107 separates housing 102 into a dirty air side or section 108 and a clean air side, section or plenum 109. Within the dirty air section 108 are provided a plurality of filter tubes or bags 120. Each filter tube 120 has a clean air exit port or open end 130 associated with or adjacent to tube sheet 107, and oriented, during assembly, such that clean air exit from the open end 130 is into the clean air section 109.

In operation, dirty air passes into the housing 102 through the dirty air inlet 104. The air is then directed through the filter tubes or bags 120. As the air enters the bags 120, particulate material carried in the air is trapped on the outer walls 140 of the bags 120. Clean air inside of the bags 120 then passes upwardly and exits through the open ends 130 (from the bags 120), through the tube sheet 107 and into the clean air section 109. The clean air is then exhausted or vented from the dust collector 100 through clean air outlet 105.

For the arrangement shown, the dust collector 100 includes an inlet baffle construction 160, a filter tube access door 170, a dust collector hopper 180, and a dust outlet 190, in a conventional manner.

In addition, the arrangement shown includes a compressed air apparatus or arrangement 200, for periodic cleaning of the filter tubes or bags 120. In general, this arrangement 200 provides for selected periodic pulses of pressurized gas in a direction of backflow through the filter tubes or bags 120. This will push collected dust off of the bag outer walls 140, causing the dust to fall into the hopper 180, from which it can be removed via the dust outlet 190. A pressurized air reservoir for use in conducting this cleaning operation is depicted at 210. Compressed air cleaning arrangements of the type depicted and described are also conventional for dust collectors.

In a large industrial dust collector of the type shown in FIG. 5 the tube sheet 107 will typically include from 48 to 484 holes therein, for attachment of individual filter bags 120. The arrangement, then, will typically include 48 to 484 filter bags 120.

At initial startup and assembly, it is necessary to install the filter bags 120. This is generally done by a worker who enters through access door 170 and stands on or over the tube sheet 107, during installation. Also, periodically, filter tubes 120 need to be serviced or replaced, again requiring a worker to enter through access door 170 and to stand on or over the tube sheet 107.

Attention is first directed to FIG. 6. FIG. 6 is a fragmentary schematic view depicting a step of installing a filter tube in a dust collector of the type depicted in FIG. 5. Referring to FIG. 6, the tube sheet 107 is shown in fragmentary schematic view. At 125, the various holes in the tube sheet 107, providing communication between the dirty air section and the clean air section (108, 109, respectively, in FIG. 5) are shown.

Referring to FIG. 6, a filter tube assembly 128 is depicted. The filter tube assembly 128 includes: filter bag 120; filter tube frame 129; and, tube frame flange (or top flange) 130. In operation, the filter tube or bag 120, which is of a flexible fabric construction, is slid over the filter tube frame 129 until top end 132 of bag 120 is brought into operative association with flange 130. Preferred connection between the flange 130 and the tube 120 is described hereinbelow with respect to FIG. 7. The filter tube frame 129 is positioned inside the bag 120 during use, and provides internal support for the bag 120 against collapse. During assembly, the arrangement 128 is slid downwardly through one of the apertures 125 until flange 130 engages tube sheet 107. The flange 130 is then secured to the tube sheet 107, by a connector arrangement as described below.

Referring to FIG. 7, filter bag 120 is shown with top edge 132 including a section sewn around a tube ring 145. Tube ring 145 is a conventional soft polymeric o-ring.

Top flange 130 includes outer circumferential depending rim 149 and inner circumferential depending rim 150. Tube ring 145 is sized and configured to fit within recess 151 defined under plate 152 and between the outer and inner rims 149 and 150. It is also sized to snugly secure filter bag 120 against an outer surface 153 of inner rim 150. This will secure bag 120 in position. (Note that framework 129 is not shown in FIG. 7.)

A secure connection between the tube frame flange 130 and the tube sheet 107 is provided by connector assembly 155. The connector assembly 155 comprises bolt construction 156 including riv-nut 157 and bolt 158. The riv-nut 157 may comprise a conventional, internally threaded, riv-nut secured to bolt hole 159 in tube sheet 107 in a conventional manner, i.e., due to compression of flanges 161 and 162. As a result of compression of the tube sheet 107 between flanges 161 and 162, riv-nut 157 is securely and non-rotatably positioned on the tube sheet 107. Alternate approaches could comprise welding of nuts similar to the riv-nuts in place and similar secure attachments.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A filter assembly comprising a filter house having an inlet and an outlet that can pass a gaseous medium, a frame within the filter housing capable of dividing the housing into a first section and a second section, a series of flexible filter bags, each bag configured for treating industrial effluent or off-gas, each bag comprising a filter fabric substrate comprising an elongated filter surface, the frame comprising sealing means connecting the flexible bags to the frame ensuring tat the gaseous medium passes through the flexible filter bag within the housing; associated with each said flexible bag, support means to prevent the bags from collapsing under the influence of the gaseous stream moving through the housing and means, in a section of the housing, to pass a gaseous stream through the housing and through the flexible bags; wherein each flexible bag is at least partially covered by a layer having a basis weight of 0.0005 to 0.2 mg-cm$^{-2}$ and a thickness of 0.1 to 3 microns comprising a polymeric fine fiber with a diameter of about 0.01 to about 0.5 micron.

2. The assembly of claim 1 wherein after test exposure for a test period of 16 hours to test conditions of 140° F. air and a relative humidity of 100%, the assembly retains greater than 30% of the fiber unchanged for filtration purposes.

3. The assembly of claim 1 wherein the polymer comprises an addition polymer.

4. The assembly of claim 1 wherein the polymer comprises a condensation polymer.

5. The assembly of claim 3 wherein to polymer comprises an addition polymer and an additive that forms a coating on the fiber.

6. The assembly of claim 4 wherein the polymer comprises a condensation polymer and an additive that forms a coating on the fiber.

7. The assembly of claim 5 wherein the additive is hydrophobic.

8. The assembly of claim 6 wherein the additive is hydrophobic.

9. The assembly of claim 3 wherein the addition polymer comprises a polyvinyl halide polymer.

10. The assembly of claim 3 wherein the addition polymer comprises a polyvinylidene halide polymer.

11. The assembly of claim 10 wherein the polyvinylidene halide comprises polyvinylidene chloride.

12. The assembly of claim 10 wherein the polyvinylidene halide comprises a polyvinylidene fluoride.

13. The assembly of claim 2 wherein the addition polymer comprises a polyvinylalcohol.

14. The assembly of claim 13 wherein the addition polymer comprises a copolymer.

15. The assembly of claim 13 wherein the polyvinylalcohol is crosslinked with about 1 to 40 wt. % of a crosslinking agent.

16. The assembly of claim 15 wherein the crosslinked polyvinylalcohol is crosslinked using a polyacrylic acid having a molecular weight of about 1000 to 3000.

17. The assembly of claim 15 wherein the crosslinked polyvinylalcohol is crosslinked using a melamine-formaldehyde resin having a molecular weight of about 1000 to 3000.

18. The assembly of claim 4 wherein the condensation polymer comprises a nylon and an additive and the additive forms a coating on the fiber with hydrophobic properties.

19. The assembly of claim 18 wherein the additive comprises a resinous oligomer having a molecular weight of about 500 to 3000 and an aromatic character wherein the additive is miscible in thy condensation polymer.

20. The assembly of claim 18 wherein the nylon comprises a polymer, other than a copolymer formed from a cyclic lactam and a $C_{6-10}$ diamine monomer or a $C_{6-10}$ diacid monomer, and an additive.

21. The assembly of claim 20 wherein the additive comprises a resinous composition comprising an oligomer having a molecular weight of about 500 to 3000 and an alkyl phenolic aromatic character wherein the additive miscible in the condensation polymer.

22. The assembly of claim 4 wherein the condensation polymer comprises a polyalkylene terephthalate.

23. The assembly of claim 4 wherein the condensation polymer comprises a polyalkylene naphthalate.

24. The assembly of claim 4 wherein the condensation polymer comprises a nylon polymer comprising a homopolymer having repeating units derived from a cyclic lactam.

25. The assembly of claim 24 wherein the nylon polymer is combined with a second nylon polymer, the second nylon polymer differing in molecular weight or monomer composition.

26. The assembly of claim 18 wherein the nylon polymer is combined with a second nylon polymer.

27. The assembly of claim 26 wherein the second nylon polymer comprises an alkoxy alkyl modified polyamide.

28. The assembly of claim 26 wherein the polymers are treated to form a single polymeric composition as measured by a differential scanning calorimeter showing a single phase material.

29. The assembly of claim 28 wherein the polymer and the second polymer are heat treated.

30. The assembly of claim 29 wherein the copolymer and the second polymer are heat treated to a temperature less than the lower melting point of the first or the second polymers.

31. The assembly of claim 6 wherein the additive comprises an oligomer comprising tertiary butyl phenol.

32. The assembly of claim 6 wherein the additive comprises an oligomer comprising bis-phenol A.

33. The assembly of claim 6 wherein the additive comprises an oligomer comprising dihydroxy biphenyl.

34. The assembly of claim 6 wherein the additive comprises a blend of the resinous additive and a fluoropolymer.

35. The assembly of claim 6 wherein the additive comprises a fluorocarbon surfactant.

36. The assembly of claim 6 wherein the additive comprises a nonionic surfactant.

37. The assembly of claim 4 wherein the condensation polymer comprises a polyurethane polymer.

38. The assembly of claim 4 wherein the condemnation polymer comprises a blend of a polyurethane polymer and a polyamide polymer.

39. The assembly of claim 38 wherein the polyamide polymer comprises a nylon.

40. The assembly of claim 18 wherein the nylon comprises a nylon homopolymer, a nylon copolymer or mixtures thereof.

41. The assembly of claim 4 wherein the condensation polymer comprises an aromatic polyamide.

42. The assembly of claim 4 wherein the condensation polymer comprises a reaction product of a diamine monomer and poly(m-phenylene isophthalamide).

43. The assembly of claim 41 wherein the polyamide comprises a reaction product of a diamine and a poly(p-phenylene terephthalamide).

44. The assembly of claim 4 wherein the condensation polymer comprises a polybenzimidazole.

45. The assembly of claim 4 wherein the condensation polymer comprises a polyarylate.

46. The assembly of claim 45 wherein the polyarylate polymer comprises a condensation polymerization reaction product between bis-phenol-A and mixed phthalic acids.

47. The assembly of claim 1 wherein the flexible bag substrate comprises a filter tube having an open end and a closed end, said open end having a seal, the gaseous stream exiting from at least a portion of the interior of the bag section.

48. The assembly of claim 47 wherein the filter tube comprises a woven fabric.

49. The assembly of claim 47 wherein the filter tube comprises a non-woven fabric.

50. The assembly of claim 47 wherein the filter tube section comprises a polyester fiber.

51. The assembly of claim 47 wherein the filter tube comprises a cotton fiber.

52. The assembly of claim 47 wherein the filter can pass about 5 to about 15 cubic feet per minute of gaseous media per square foot of filter media.

53. The assembly of claim 47 wherein there are about 10 to about 100 filter tubes in the housing.

54. The assembly of claim 47 wherein the filter tube comprises a layer of fine fiber on an upstream surface of the filter tube and a second layer of fine fiber on an exit surface of the filter tube.

55. A bag house filter apparatus comprising:
(a) a housing defining an interior, an inlet and an outlet;
(b) a frame mounted within the housing interior;
(c) at least two filter bags each bag configured for treating industrial effluent or off-gas each bag mounted on and sealed against said frame;
  (i) each of said filter bags having an exterior, upstream surface and an interior, downstream surface defining an interior volume; each of the filter bags having a clean air opening communicating with the interior volume; and
  (ii) each filter bag exterior surface having uniformly deposited thereon a fine fiber layer with a thickness of 0.1 to 3 microns, a diameter of 0.001 to 0.5 microns and a basis weight of about 0.0005 to 0.2 mg-cm$^{-2}$; and
(d) a blower arrangement to move an air stream through the housing inlet, through the filter bags from the upstream surface to the downstream surface into the interior volume and then exit the interior volume through the clean air opening, and through the housing outlet.

56. An apparatus according to claim 55 wherein each of the filter bags is rectangular, with substantially parallel walls.

57. An apparatus according to claim 55 wherein each of the filter bags is tube-shaped.

58. An apparatus according to claim 55 wherein each of the filter bags comprises a woven fabric.

59. An apparatus according to claim 55 wherein each of the fabric bags comprises a non-woven fabric.

60. An apparatus according to claim 55 wherein each of the filter bags comprises a polyester fiber.

61. An apparatus according to claim 55 wherein each of the filter bags comprises a cotton fiber.

62. An apparatus according to claim 55 wherein the filter apparatus can pass about 5 to about 15 cubic feet per minute of gaseous media per square foot of filter media.

63. An apparatus according to claim 55 wherein there are about 10 to about 100 filter bags in the housing.

64. An apparatus according to claim 55 wherein each of the filter bags comprises a layer of fine fiber on the upstream surface of each of the filter bags and a second layer of fine fiber on the exit surface of each of the filter bags.

65. An apparatus according to claim 55 wherein the layer of fine fiber has a basis weight of about 0.001 to 0.1 milligram per square centimeter.

66. A method of filtering an air stream containing a particulate, the method comprising the steps of:
(a) placing an air filtration bag within a filter housing having an air inlet and an air outlet, said filter housing comprising a frame support within the housing dividing the housing into two sections, a clean section and a dirty section, the housing and frame comprising a series of flexible filter bags of an air pervious material, each bag configured for industrial effluent of off-gas, each bag including a substantially open upper end and a seal to the frame, sealing members secured to at least one of the filter bags maintaining the separation between the clean section and the dirty section, air pervious support means within said bags to prevent the bags from collapsing and means in one section of the housing to cause air to pass through the bags;
(b) and passing the air through the filter bags to ensure that the particulate is removed from the air stream, said filter bag having an exterior surface and an interior surface, the exterior surface having uniformly deposited thereon a fine fiber layer at a basis weight of about 0.0005 to 0.2 mg-cm$^{-2}$ and a thickness of 0.1 to 3 microns, the fiber having a diameter of 0.01 to 5 microns, said air passing into the bag and exiting the interior surface.

67. The method of claim 66 wherein the filtration method includes a pulse cleaning step wherein dust forming on the exterior of the bag is removed by a short reversal of the air flow resulting in a substantially reduced pressure drop.

68. The method of claim 66 wherein the filtration method includes a mechanical vibratory cleaning of the bag wherein dust forming on the exterior of the bag is removed by a vibration resulting in a substantially reduced pressure drop.

69. A method of making a filter bag for an industrial bag house, the steps comprising:
(a) forming a layer of fine fiber on an industrial bag house fabric, the fiber having a diameter of about 0.01 to 0.5 microns and a basis weight of about 0.0005 to 0.2 mg-cm$^{-2}$, said layer having a thickness of about 1 to 100 times the fiber diameter forming a fiber and fabric; and
(c) assembling the fiber and fabric into a bag configured for industrial effluent or off-gas filtration.

70. The method of claim 69 wherein a step of heat treating the fiber and fabric for a period of time that effectively increases the adhesion of the fiber to the fabric forming an adhered fiber and fabric.

71. The method of claim 70 wherein the heat treating step is performed after the bag is assembled.

72. The method of claim 69 wherein the fiber and fabric is made into the form of a roll of fiber and fabric and the fiber and fabric is unrolled, cut and sewn into the bag.

73. The method of claim 69 wherein the fiber is electrospun onto a woven fabric.

74. The method of claim 70 wherein the fiber and fabric are heat treated at a temperature less than a melting point of one of the fine fibers.

75. The method of claim 69 wherein the layer of fine fiber is formed on the fabric by laminating a preformed fine fiber layer.

76. The assembly of claim 47 wherein the fine fiber is covered with a layer that prevents abrasion of the fine fiber layer.

77. The assembly of claim 76 wherein the layer that prevents abrasion comprises a scrim with a basis weight of about 0.2 to 2 oz-yd$^{-2}$.

78. The assembly of claim 47 wherein the filter tube comprises a layer of fine fiber on the exit surface of the filter tube.

79. The assembly of claim 4 wherein the condensation polymer comprises a nylon polymer, and a resinous additive comprising an oligomer having a molecular weight of about 500 to 3000 and an aromatic character wherein the additive is miscible in the condensation polymer.

80. The assembly of claim 47 wherein the layer of fine fiber has a thickness of about 0.1 to about 3 microns and has a basis weight of about 0.001 to 0.1 milligram per square centimeter.

81. A filter bag for an industrial bag house, the bag comprising:
(a) a layer of fine fiber, on an upstream surface of the bag, the bag comprising a layer of an industrial bag house fabric, the fine fiber layer having a fiber diameter of about 0.01 to 0.5 microns and a basis weight of about 0.0005 to 0.2 mg-cm$^{-2}$, said fine fiber layer having a thickness of about 1 to 100 times thickness of the fine fiber; wherein after test exposure for a test period of 16 hours to test conditions of 140° F. air and a relative humidity of 100% the bag retains greater than 30% of the fine fiber unchanged for filtration purposes and the bag is sized to pass 5 to 15 cubic fact per minute of gaseous media per square feet of filter media.

82. The bag of claim 81 wherein the line fiber is covered with a layer that prevents abrasion of the fine fiber layer, and the bag comprises a tube with an open end and a closed end.

83. The bag of claim 81 wherein the polymer comprises an addition polymer and an additive that forms a coating on the fiber.

84. The bag of claim 83 wherein the polymer comprises a nylon and the additive forms a coating on the fiber with hydrophobic properties.

* * * * *

UNITED STATES PATENT AND TRADEMARK OFFICE
CERTIFICATE OF CORRECTION

PATENT NO. : 6,740,142 B2
DATED : May 25, 2004
INVENTOR(S) : Buettner et al.

It is certified that error appears in the above-identified patent and that said Letters Patent is hereby corrected as shown below:

<u>Column 22,</u>
Line 26, "or off-gas each bag" should read -- or off-gas, each bag --
Line 51, "the fabric bags" should read -- the filter bags --
Line 67, "milligram per square centimeter." should read -- $mg\text{-}cm^{-2}$. --

<u>Column 24,</u>
Line 41, "15 cubic fact per" should read -- 15 cubic feet per --
Line 43, "the line fiber" should read -- the fine fiber --

Signed and Sealed this

Twenty-fourth Day of August, 2004

JON W. DUDAS
*Director of the United States Patent and Trademark Office*